United States Patent

[11] 3,576,392

[72] Inventor Steven R. Hofstein
Princeton, N.J.

[21] Appl. No. 740,350
[22] Filed June 26, 1968
[45] Patented Apr. 27, 1971
[73] Assignee RCA Corporation

[54] SEMICONDUCTOR VIDICON TARGET HAVING ELECTRONICALLY ALTERABLE LIGHT RESPONSE CHARACTERISTICS
20 Claims, 10 Drawing Figs.

[52] U.S. Cl. .......... 178/7.1, 313/65
[51] Int. Cl. .......... H04n 3/14
[50] Field of Search .......... 178/7.1, 6.8, 5.4 (STC), 5.4; 313/65 (AB), 65 (A)

[56] References Cited

UNITED STATES PATENTS

| | | | |
|---|---|---|---|
| 3,083,262 | 3/1963 | Haulet | 178/7.1 |
| 3,111,556 | 11/1963 | Knoll et al. | 178/7.1 |
| 3,403,284 | 9/1968 | Buck et al. | 178/7.2 |
| 3,423,623 | 1/1969 | Wendland | 313/65(AB) |

OTHER REFERENCES

Proceedings of IEEE Vol. No. 9 Sept. 1967 pps. 1591—1601 " A Self-Scanned Solid State Image Sensor" by Weimer et al.

*Primary Examiner*—Richard Murray
*Assistant Examiner*—Richard P. Lange
*Attorney*—Glenn H. Bruestle

ABSTRACT: A silicon vidicon target comprises an N-type silicon wafer having one surface exposed to incident light, and a large number of discrete P-type regions diffused into the opposite wafer surface, which is scanned by an electron beam. A transparent electrode overlies a transparent insulator disposed on the illuminated wafer surface. The optical sensitivity and spectral response of the target are varied by applying a bias voltage between the transparent electrode and the N-type wafer.

INVENTOR
STEVEN R. HOFSTEIN
BY
ATTORNEY

INVENTOR
STEVEN R. HOFSTEIN

BY [signature]
ATTORNEY

INVENTOR
STEVEN R. HOFSTEIN

BY [signature]
ATTORNEY

INVENTOR
STEVEN R. HOFSTEIN

BY [signature]
ATTORNEY

INVENTOR
STEVEN R. HOFSTEIN
BY
ATTORNEY

SEMICONDUCTOR VIDICON TARGET HAVING ELECTRONICALLY ALTERABLE LIGHT RESPONSE CHARACTERISTICS

BACKGROUND OF THE INVENTION

This invention relates to a device for converting optical images to electrical signals, and more particularly to devices of this type in which the conversion is accomplished by means of a semiconductor target exposed to the optical image.

An image conversion tube commonly employed in television applications is that known as the vidicon. The operation of the vidicon is well known in the art, and involves (i) the exposure of a semiconductor target to an optical image which alters the electrical characteristics of the target in a pattern corresponding to the image, and (ii) the scanning of the target by an electron beam to convert the spacial electrical characteristic distribution of the target to a video signal.

A particular type of vidicon presently receiving considerable attention is that known as the semiconductor diode vidicon. Such a structure employs a target comprising (i) a semiconductor wafer having a continuous PN junction plane separating semiconductor regions of mutually opposite conductivity type, or (ii) a semiconductor wafer of one conductivity type having a multiplicity of discrete semiconductor regions of opposite conductivity type, forming corresponding PN junctions with the wafer.

The present invention is applicable to semiconductor vidicon diodes of both the continuous junction and "structured" or multiple junction type.

The present invention is also applicable to such diodes employed as targets for optical image conversion devices utilizing solid state scanning, as opposed to electron beam scanning.

Semiconductor diode vidicons of these types are well known in the art and are described, e.g., in the following references:

a. M. H. Crowell, T. M. Buck, E. F. Labuda, J. V. Dalton and E. J. Walsh, "A Camera Tube with a Silicon Diode Array Target," The Bell System Technical Journal, Feb. 1967, pp. 491—495;
b. P. H. Wendland, "A Charge Storage Diode Vidicon Camera Tube," IEEE Conference Record of 1966 Eighth Conference on Tube Techniques, Sept. 20—22, 1966, pp. 197—204;
c. E. I. Gordon, "A 'Solid-State' Electron Tube for the Picturephone Set," Bell Laboratories Record, June 1967, pp. 175—179; and
d. W. H. Crowell, T. M. Buck, E. F. Labuda, J. V. Dalton and E. J. Walsh, "An Electron Beam-Accessed, Image-Sensing, Silicon-Diode Array with Visible Response," Digest of Technical Papers, 1967 International Solid-State Circuits Conference, Feb. 17, 1967, University Museum/Univ. of Pennsylvania, pp. 128—129.

Although the semiconductor diode vidicon, and especially the silicon vidicon (defined for the purposes of this specification as a vidicon employing as a target a silicon wafer of one conductivity type having a multiplicity of discrete regions of opposite conductivity type inset into the wafer from one major surface thereof), possesses a number of electrical performance and environmental advantages over previously known vidicons employing antimony trisulfide or lead oxide targets, it suffers from a limited optical dynamic range.

In order to extend the optical dynamic range of vidicons heretofore known, it has been necessary to employ mechanically complex optical aperture control systems, with consequent limitations upon the versatility of operation obtainable due to the limited speed of operation of such optical systems.

SUMMARY OF THE INVENTION

Optical image conversion apparatus is provided, comprising a target having a surface exposed to the optical image. The target comprises a semiconductor wafer of one conductivity type having at least one region of opposite conductivity type adjacent one major surface of the wafer.

Minority carrier recombination means is provided at the wafer surface exposed to the optical image. Means, including a control electrode capacitively coupled to the wafer, is provided for varying the response of the target to incident optical radiation.

IN THE DRAWING

DETAILED DESCRIPTION

Figure 1:
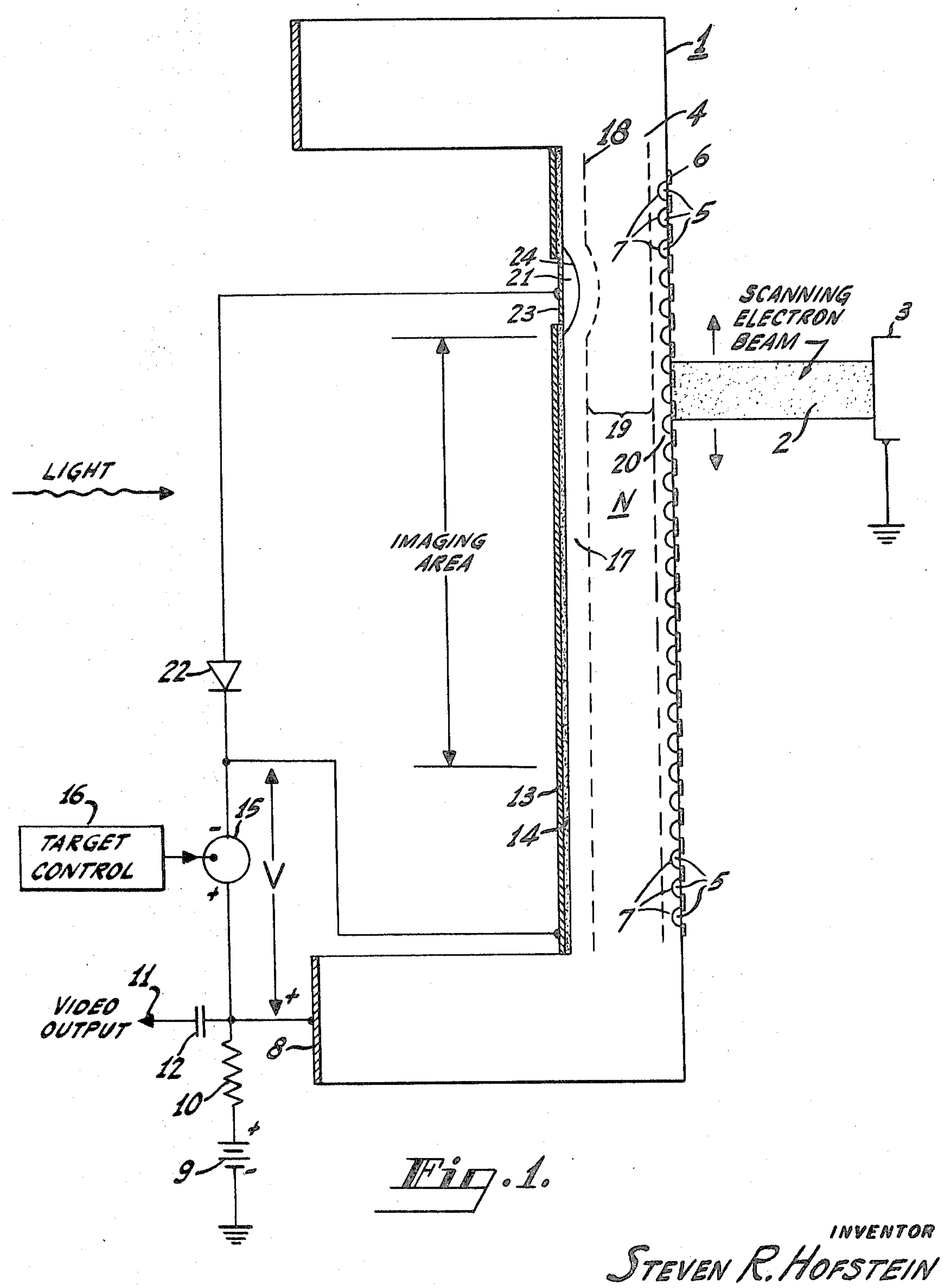
FIG. 1 shows a cross-sectional view of a semiconductor diode vidicon target assembly according to a preferred embodiment of the invention.

In a vidicon tube employing a structured silicon diode target 1, as shown in FIG. 1, one surface of the target is scanned by a low velocity electron beam 2 emanating from a cathode 3. The electron beam 2 is formed, collimated, focused, deflected and accelerated by a suitable electron gun structure (not shown). Typically, the electron beam 2 may have a circular cross section with a diameter on the order of 1 mil.

The target 1 comprises a substrate 4 of N-conductivity-type monocrystalline semiconductor material, preferably silicon, into which a large number of small regions 5 of P-conductivity-type have been diffused. Each of the regions 5 may be circular with a diameter typically on the order of 0.1 to 0.5 mil.

A silicon dioxide layer 6 overlies and protects the portions of the target surface at which the PN junctions 7 formed between the substrate 4 and the diffused regions 5 emerge.

The substrate 4 has a relatively thick ring-shaped peripheral portion by means of which the target 1 can be handled and mounted in a suitable evacuated electron tube structure. An aluminum layer 8 makes ohmic electrical contact to the thickened peripheral portion of the target 1. Each of the PN junction 7 is sequentially reverse biased to substantially the potential of the DC source 9 via the electric path comprising the load resistor 10, electrode 8, electron beam 2 and cathode 3. The electron beam 2 sequentially impinges upon each of the P-type regions 5 to bring each of these regions to cathode (ground) potential.

Typically, the voltage source 9 may have a value on the order of 10 volts and the load resistor 10 may be on the order of several hundred thousand ohms.

After each of the diodes, formed by each of the diffused regions 5 in conjunction with the substrate 4, has been reverse biased to approximately 10 volts by means of the electron beam 2, it is gradually discharged by light focused upon the surface of the substrate 4 within the imaging area. The amount by which each of the diodes is discharged depends upon the total photon flux from the incident light image which reaches the diode in the period (frame time $T_f$) between successive scans of the electron beam 2.

When the scanning electron beam 2 returns to each diode, electrons flow to the corresponding P-type region 5 to provide a current which recharges the associated diode. This recharging current is directly related to the total photon flux which has impinged upon the corresponding part of the substrate 4. The recharging current flows through the load resistor 10 to produce a corresponding video output signal 11 which is coupled to suitable amplifier circuitry by means of a capacitor 12.

Instead of employing an electron beam to recharge the associated diodes, the recharging current may be provided by means of conductors electrically coupled to each of the P-type regions 5. The electrodes may be arranged in a suitable coordinate array which can be scanned by circuit techniques well known in the art. The control electrode structure described herein is equally applicable to such optical image conversion devices employing solid state scanning.

The incident light, the intensity pattern of which corresponds to an optical image, discharges the individual diodes by generating electron-hole pairs in the vicinity of the associated PN junctions 7. The generated holes (minority carriers) diffuse through the N-type substrate 4 to the corresponding PN junctions 7, where they are swept across the junctions by the associated space charge fields.

Light of longer visible (red) and infrared wavelengths penetrates relatively deeply into the substrate 4, so that the corresponding electron-hole pairs are generated relatively close to the PN junctions 7. Thus, minority carriers produced by such long wavelength light may more easily diffuse to the PN junctions, resulting in relatively great response of the target 1 to red and near red infrared radiation. Since the substrate 4 is relatively thin (typically 10 microns thick) in the region adjacent the imaging area, the longer infrared wavelengths may penetrate entirely through the substrate without appreciable absorption, so that the sensitivity of the target 1 to these wavelengths is relatively low.

The shorter optical wavelengths of the incident light, especially in the blue range, are absorbed very near the surface of the substrate 4 exposed to the optical image, so that the corresponding minority carriers generated by this light must diffuse almost completely through the substrate 4 to reach the PN junctions 7. Since a number of the minority carriers created by incident photons recombine within the substrate 4 and at the surface thereof and are therefore lost, only a small percentage of the carriers generated by relatively short wavelength light reach the PN junctions 7 to discharge the associated diodes.

By controlling the recombination rate, i.e. the percentage of the minority carriers which recombine before diffusing through the substrate 4 to the PN junctions 7, the effective sensitivity of the target 1 to incident light may be controlled.

Such control may be achieved, according to one embodiment of the invention, by means of a transparent structure comprising a control electrode 13 disposed on an insulating layer 14, as shown in FIG. 1.

The insulating layer 14 may, e.g., comprise a glass such as thermally grown silicon dioxide, and may typically have a thickness in the range of 500 Angstroms to several microns.

The control electrode 13 may comprise an adherent relatively transparent layer of a metal such as chromium, which may preferably be deposited to the minimum practicable thickness (typically on the order of a few hundred Angstroms) which yields maximum light transmissibility while retaining sufficient lateral conductivity to insure proper transient response to variations in control voltage.

The control electrode 13 is thus capacitively coupled to the adjacent surface of the substrate 4 via the dielectric layer 14.

In order to control minority carrier (hole) recombination within the substrate 4, a potential difference is established between the control electrode 13 and the substrate 4 by means of a variable voltage source 15, the voltage of which is varied by means of suitable target control circuit 16. The polarity of the voltage source 15 is such that the control electrode 13 is relatively negative with respect to the substrate 4. The capacitive coupling between the (relatively negative) control electrode 13 and the adjacent portion of the substrate 4 repels majority carriers (electrons) away from the substrate surface, to establish a depletion region 17 adjacent the surface. Within the depletion region 17 an electric field exists, polarized in a direction which impels minority carriers toward the substrate surface adjacent the dielectric layer 14.

In order to prevent the accumulation of holes at the substrate surface, a mechanism must be provided to enable the holes to recombine with electrons in the vicinity of the surface.

This minority carrier (hole) recombination mechanism may be provided by deliberately treating the surface of the substrate 4 adjacent the dielectric layer 14 to increase the surface recombination velocity. Such treatment may, e.g., comprise electron bombardment of the substrate surface to introduce surface states and crystal defects which serve as minority carrier recombination centers. Preferably, these recombination centers should be localized to the substrate surface and should extend into the substrate a distance which is very small compared to the width of the depletion layer 17. When such a surface degradation technique is employed, the resultant surface recombination velocity should preferably be on the order of $10^2$ to $10^6$ cm./sec. or more.

The depletion layer 17 established by the capacitively coupled control electrode 13 reduces the region of the substrate 4 within which photon generated minority carriers can effectively contribute to the video signal. That is, light which does not penetrate beyond the outer boundary 18 of the depletion layer 17 generates minority carriers only within the depletion layer. These minority carriers are swept by the depletion layer field toward the semiconductor surface, where they undergo recombination.

Thus, holes generated by incident light do not reach the PN junctions 7 to contribute to the discharge of the corresponding diodes, and therefore have no effect upon the video output signal 11. Since light of relatively short wavelength penetrates only a small distance into the semiconductor material, such short wavelength light will be more greatly affected than the relatively long wavelength light, which can penetrate into the substantially field-free portion 19 of the substrate 4 between the depletion layer 17 and the depletion layer 20 associated with the PN junctions 7.

While providing a high surface recombination velocity, in conjunction with the negatively biased control electrode 13, results in modulation of the sensitivity and spectral response of the target 1 to incident optical radiation, only a limited amount of control can effectively be obtained by this technique. The reason for this limitation on the control obtainable is that as the voltage of the source 15 is increased to drive the depletion layer 17 further into the substrate 4 (thus reducing the width of the field-free region 19 within which minority carrier generation effectively contributes to the video signal), the majority carrier concentration within the depletion layer 17 adjacent the dielectric layer 14 continually decreases until the polarizing effect of the control electrode 13 becomes so great that inversion occurs at the surface, i.e. the surface is converted to P-conductivity-type. When this inversion occurs, the optical image sensitivity of the target 1 is destroyed as a result of field capture, lateral redistribution and reinjection of holes into the d N-type substrate 4.

Since the depletion layer 17 can be driven only a relatively small distance into the substrate 4 (typically on the order of 1.4 microns for silicon of 10 ohm-cm. resistivity) before inversion occurs, the degree of sensitivity and spectral control obtainable is limited.

In order to alleviate this difficulty, a P-type region 21 is provided in the substrate 4 adjacent the control electrode 13 and dielectric layer 14. This P-type region 21, which is electrically connected to the control electrode 13 via the diode 22, serves as a "sink" for minority carriers to prevent accumulation of holes at the substrate surface, thereby inhibiting surface inversion. An aluminum electrode 23 makes ohmic contact to the P-type region 21, which forms a PN junction 24 with the substrate 4. This PN junction must be able to withstand the potential difference of the source 15, which essentially appears across the junction 24. At the same time, the resistivity of the P-type region 21 must be sufficiently low so that the boundary of the depletion layer which extends into the P-type region 21 does not reach the electrode 23. If this were permitted to happen, "punch-through" breakdown of the PN junction 24 would occur.

Under certain circumstances, it may be desirable to make the dielectric 14 relatively thick, thus requiring application of a relatively high potential difference between the control electrode 13 and the substrate 4. In order to avoid voltage breakdown of the PN junction 24, the P-type region 21 may be connected to a separate voltage source, it being necessary only that the potential difference applied between the P-type region 21 (this region being maintained relatively negative) and the substrate 4 be such that the P-type region 21 is situated at a potential more negative than that of the adjacent substrate surface.

With the P-type region 21 electrically connected to the control electrode 13, the depletion layer 17 may be driven as deeply as desired into the substrate 4 (the penetration of the depletion layer into the substrate 4 being limited only by voltage breakdown of the dielectric layer 14 or the PN junction 24) without loss of the optical image due to inversion of the surface of the substrate 4 adjacent the dielectric layer 14.

When it is not desired to reduce the sensitivity or spectral response of the target 1, the control electrode 13 is preferably made somewhat positive with respect to the substrate 4 by reversing the polarity of the voltage source 15. The effect of such positive polarization of the control electrode 13 is to produce an electric field oriented to impel minority carriers from the surface.

Consequently, minority carriers generated within the substrate 4 by incident optical radiation near the substrate surface underlying the dielectric layer 14, will be impelled by the induced electric field away from the surface and toward the PN junctions 7. The net result is that surface recombination of the generated minority carriers is reduced, while drift of the carriers toward the PN junctions 7 is enhanced, thus actually increasing the sensitivity of the target 1 compared to the sensitivity which is obtained without the application of any bias whatsoever to the control electrode 13.

When he control electrode 13 is relatively positive with respect to the substrate 4, the diode 22 prevents positive biasing of the P-type region 21. If the region 21 were permitted to receive positive bias, it would inject holes into the substrate 4, thus resulting in serious deterioration or complete destruction of the target response to optical radiation.

Figure 2:
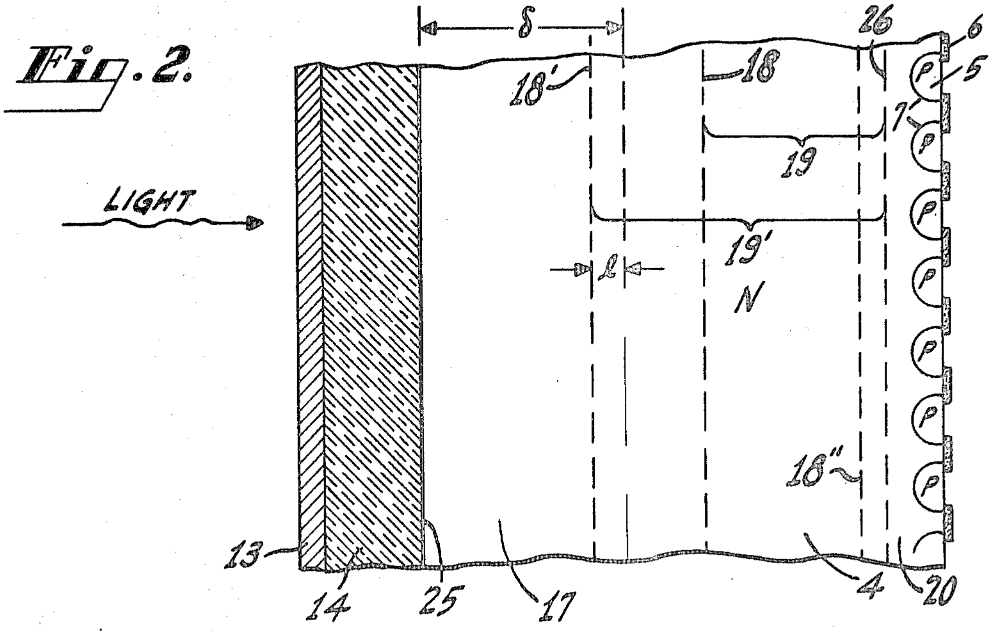
FIG. 2 shows a cross-sectional view of part of the target shown in FIG. 1.
Figures 3, 4:
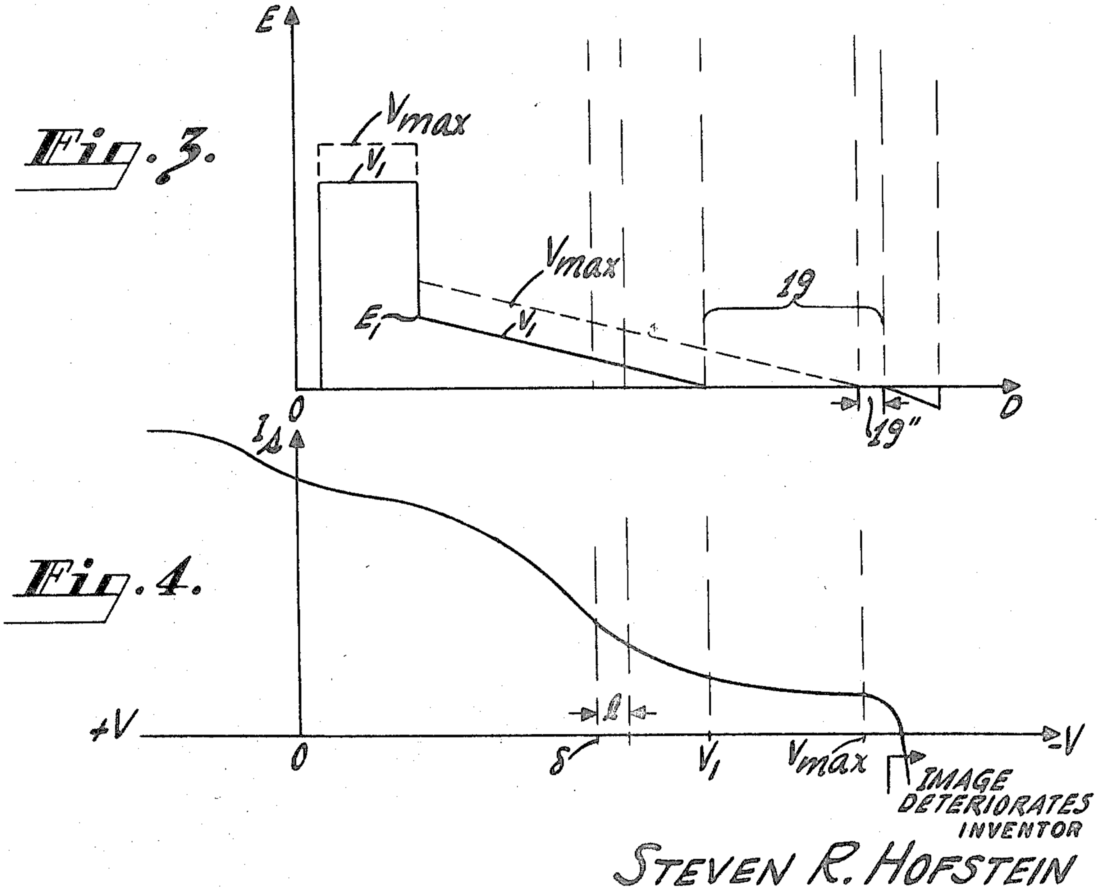
FIG. 3 shows the electric field distribution within the target portion of FIG. 2.
FIG. 4 is a graph showing the response of the target of FIG. 1 to incident optical radiation, as a function of control electrode bias voltage.

The manner in which the control electrode 13 modulates the sensitivity and spectral response of the target 1 will be more clearly understood from the following description, with reference to FIGS. 2, 3 and 4 of the drawing.

A portion of the imaging area of the target 1 is shown in FIG. 2. Light incident upon the surface 25 of the substrate 4 penetrates a distance $\delta$ into the semiconductor material before being absorbed. When the potential difference between the control electrode 13 and the substrate 4 is such that the outer boundary 18 of the induced depletion layer extends a distance into the substrate 4 which is greater than $\delta$, the minority carriers generated by the incident light will be impelled toward the surface 25 by the depletion layer field.

At the surface 25, the depletion layer field has a small lateral component which directs the holes toward the P-type region 21 (see FIG. 1). When the holes reach the PN junction 24 adjacent the P-type region 21, they diffuse across the junction into the region 21, where they are now majority carriers. These holes recombine with electrons at the "ohmic" electrode 23.

Thus, when the outer boundary 18 of the depletion layer 17 extends as deeply into the substrate 4 as the penetration distance $\delta$ of the incident light, the light does not contribute to the video signal, since the resultant minority carriers do not reach the PN junctions 7 to discharge the associated diodes.

The control electrode 13 substantially influences the sensitivity of the target 1 to incident light even when the bias applied thereto is reduced so that the outer boundary of the depletion layer 17 is at a position 18′ corresponding to a depletion layer depth slightly less than the penetration distance $\delta$ of the light into the substrate 4. So long as the difference between the depletion layer depth and the penetration depth is less than the minority carrier diffusion length $l$, a substantial proportion of the minority carriers which are generated in the substrate 4 by incident light will diffuse into the depletion layer 17, where they are swept toward the surface 24 and into the P-type region 21.

Since each of the PN junctions 7 is reverse biased (to a voltage typically on the order of 10 volts, as previously mentioned), each of the PN junctions 7 is surrounded by a depletion layer. The dashed line 26 represents the outer boundary of the individual depletion layers associated with each of the PN junctions 7.

The electric field distribution within the target 1 is as shown in FIG. 3, wherein the electric field amplitude E is plotted as a function of distance D from the outer surface of the control electrode 13; the graph of FIG. 3 is vertically aligned with the partial cross-sectional view of FIG. 2.

The curve labeled $V_1$ corresponds to a potential difference between the control electrode 13 and the substrate 4, i.e. a value of the source 15, which establishes a depletion layer within the substrate 4 having an outer boundary designated by the dashed line 18 in FIG. 2. It is seen that the electric field is relatively high in the dielectric layer 14 (the precise field value depends upon the thickness of the dielectric layer and its dielectric constant). At the interface between the dielectric layer 14 and the substrate 4, the electric field is discontinuous and drops to a relatively low value $E_1$ (determined by the ratio between the dielectric layer and semiconductor material dielectric constants), from which the field within the semiconductor material declines substantially linearly to essentially zero at the outer boundary 18 of the depletion layer 17.

The portion 19 of the substrate 4 extending between this outer boundary 18 and the outer boundary 26 of the depletion layer associated with the PN junctions 7 is essentially field-free. A relatively small electric field, in a direction opposite to the electric field within the depletion layer 17, exists in the depletion layer 20 associated with the PN junctions 7.

As the voltage V generated by the source 15 is increased, i.e. the control electrode 13 is biased more negatively, the depletion layer 17 extends more deeply into the substrate 4, thus increasing the portion of the substrate within which an electric field exists to direct minority carriers toward the surface 25 and away from the PN junctions 7. Therefore, as the voltage V is increased, the spectral response of the target 1 is modified so that the shorter optical wavelengths are attenuated more than the longer wavelengths, due to the greater penetration depth of the longer wavelength. The sensitivity of the target 1 to any particular wavelength is decreased, since the size of the field-free region is reduced, i.e. the "active" volume of the substrate 4 is decreased.

Preferably, the maximum voltage $V_{max}$ generated by the source 15 should be such that the outer boundary of the resultant depletion layer, as designated by the dashed line 18″, is situated a small distance from the outer boundary 26 of the depletion layer 20, thus leaving a small field-free region 19″ between the depletion layers 17 and 20. Overlapping of these depletion layers may result in deterioration of image quality.

For a particular optical wavelength within the visible range, the variation of video signal current $I_s$, as a function of the voltage V generated by the source 15, is as shown in FIG. 4. FIG. 4 is vertically aligned with FIGS. 2 and 3, so that the horizontal axis of FIG. 4 (for negative values of V) also represents the penetration of the depletion layer 17 into the substrate 4.

As the control voltage V is made more negative, starting from zero bias, the signal current $I_s$ decreases, gradually at first and then more rapidly. When the voltage is increased to a value where the outer boundary of the depletion layer 17 is at the position designated by the line 18' (see FIG. 2), within a diffusion length $l$ of the penetration depth $\delta$ of the incident light, the signal current begins decreasing more slowly, and levels off as the outer boundary of the depletion layer extends beyond the penetration depth of the incident light.

Increasing the control voltage beyond the preferred limit $V_{max}$ results in an increase of photocurrent in the opposite direction as the depletion layer 17 begins to overlap the depletion layer 20. However, the photocurrent no longer corresponds to the optical image, and therefore represents a deterioration of the response of the target 1. The photocurrent increase produced by these large values of applied control voltage results from leakage current across the PN junctions 7 due to change in the bias voltage across these junctions by the field of the depletion layer 17.

When the applied voltage V is reversed, i.e. the polarity of the control electrode is made relatively positive with respect to the substrate 4, an accumulation of electrons at the surface 25 (see FIG. 2) results in an increase of signal current $I_S$. Further increase of the control voltage V in the positive direction has little effect on the signal current, since surface recombination effects limit the improvement obtainable.

Instead of applying a positive potential to the control electrode 13, the electron accumulation at the surface 25 desired for signal current enhancement may be provided by forming the dielectric layer 14 in such a manner that positive charge is incorporated in the dielectric layer. This positive charge results in a "builtin" electric field which accumulates the adjacent surface 25. Such charge may, e.g., readily be introduced by forming the dielectric layer 14 in the presence of a trace quantity of an alkali metal vapor.

Figure 5:
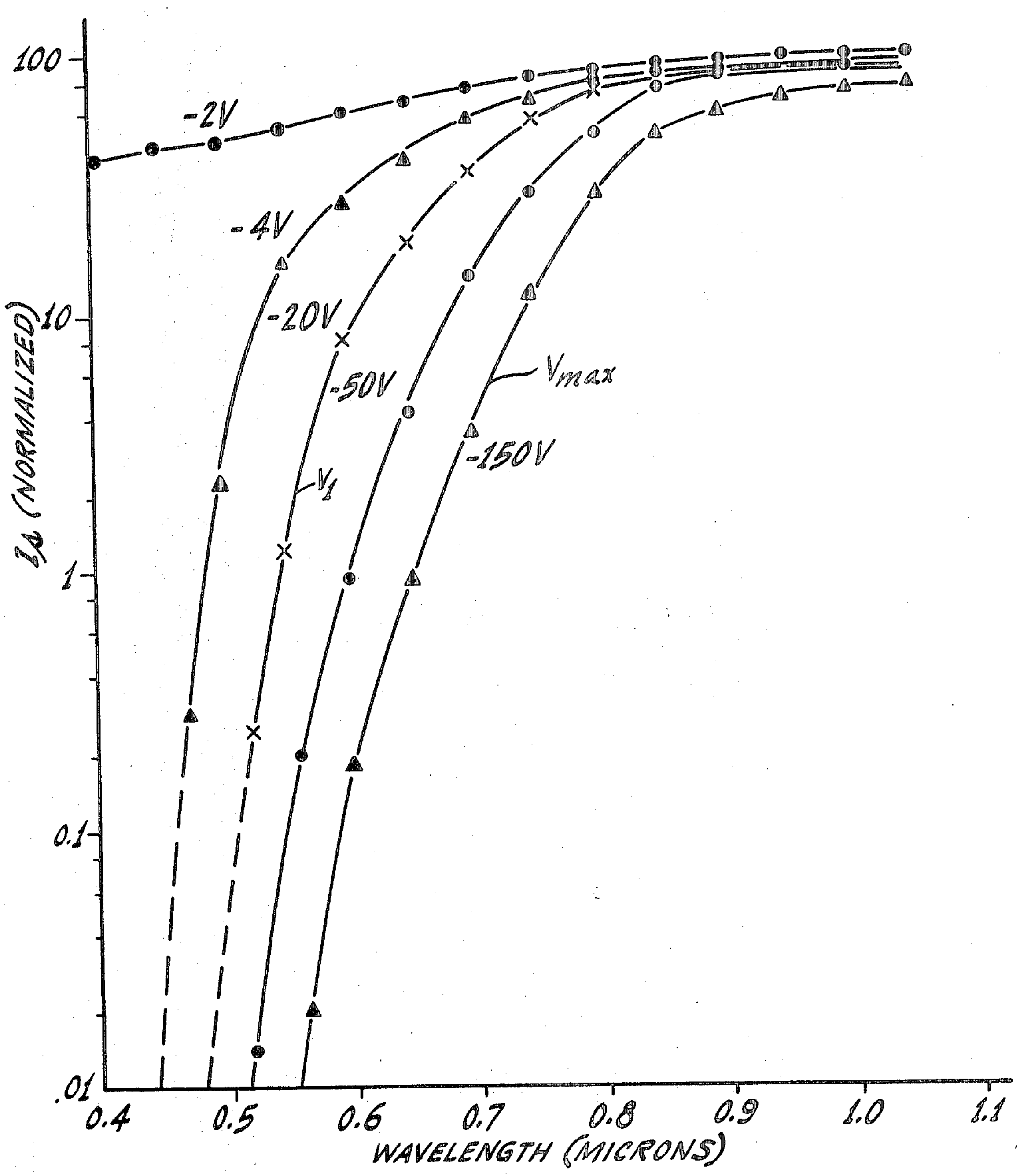
FIG. 5 shows the normalized spectral response of the target of FIG. 1, with control electrode bias voltage as a parameter.

A normalized graph of signal current as a function of wavelength, i.e. the spectral response characteristics of the target 1, is shown in FIG. 5. FIG. 5 shows spectral response curves corresponding to various bias voltages applied to the control electrode 13. It is seen that as the bias voltage is increased toward $V_{max}$, the shorter wavelengths of the visible range are progressively attenuated, the longer (red) wavelengths remaining relatively unaffected. The response of the target falls off in the infrared range (not shown in FIG. 5), since the relatively thin (10 microns) target is substantially transparent to infrared light.

The sensitivity of the target 1 to any particular wavelength can be varied over a wide range (see FIG. 4) by varying the bias voltage V applied to the control electrode 13. For example, with the silicon target 1, having a dielectric layer 14 of 1 micron thickness, and a maximum applied control voltage $V_{max}$ of 150 volts, the signal current $I_S$ may be varied over a 20,000:1 range for incident light at 4,000 to 5,300 Angstroms. For incident light at 6500 Angstroms, the signal current may be varied over a 50:1 range.

It is therefore evident that, by selecting suitable values of control voltage V, the target 1 may alternately be made sensitive to (i) the entire visible range, (ii) the visible range minus the blue portion of the spectrum, or (iii) only the red portion of the spectrum. Sequential switching of control voltages between the aforementioned values permits utilization of a single vidicon target for derivation of color video signals, as will hereinafter be described.

Figure 6:
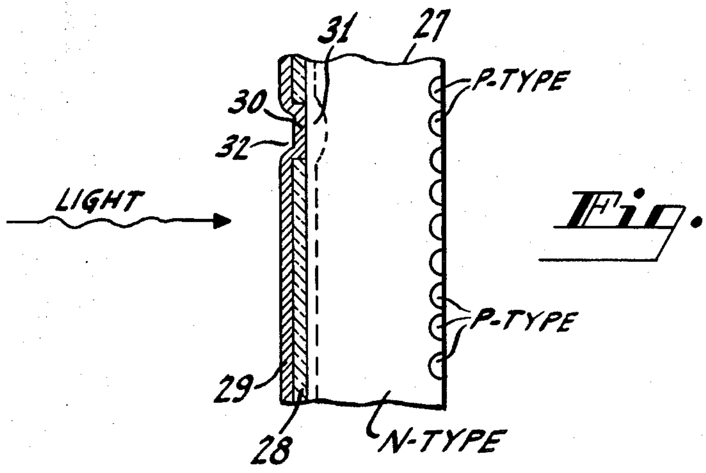
FIG. 6 shows a cross-sectional view of a portion of a semiconductor diode vidicon target according to an alternative embodiment of the invention.

Rather than employing a diffused P-type region 21 (see FIG. 1) to provide a "sink" for minority carrier recombination, equally satisfactory results may be achieved by means of a Schottky barrier diode structure, as illustrated in FIG. 6. The target 27, a portion of which is shown in FIG. 6, is substantially similar to the target 1 of FIG. 1, except for the control electrode structure comprising the transparent dielectric layer 28, the capacitively coupled transparent control electrode 29 and the Schottky barrier diode formed by the metallic layer 30 and the adjacent portion 31 of the silicon substrate of the target 27.

The dielectric layer 28 may comprise a thermally grown silicon dioxide layer provided with a small (5 to 50 mils in diameter) aperture 32 exposing the silicon substrate. The control electrode 29 and Schottky diode electrode 30 are provided by a continuous layer of platinum, which is sputtered onto the target 27.

While the platinum layer may be sputtered in any suitable noble gas atmosphere, we prefer to employ helium as the sputtering atmosphere because of its relatively small molecular weight. We have found that sputtering in a helium atmosphere results in improved adherence and greater density of the platinum layer.

The sputtered platinum layer is sufficiently thin so that the control electrode 29 is substantially transparent to incident light, and exhibits adequate electrical conductivity. The portion 30 of the sputtered platinum layer is preferably reacted with the underlying portion 31 of the silicon substrate to form a platinum silicide ($Pt_5Si_2$) electrode, with a rectifying Schottky barrier between the platinum silicide layer and the silicon substrate material.

Since the Schottky barrier diode is directly connected to the control electrode 29 (instead of being connected by way of an external diode 22 as shown in FIG. 1), the control electrode 29 cannot be made positive with respect to the substrate of the target 27, as this would result in hole injection by the Schottky barrier with consequent deterioration or destruction of the optical image pattern. Thus the sensitivity realizable from the target 27, other parameters being equal, is somewhat less than that which can be provided by the target 1 when the control electrode voltage is made positive. With this single exception, the target 27 functions in the same fashion as the target 1.

Figure 7:
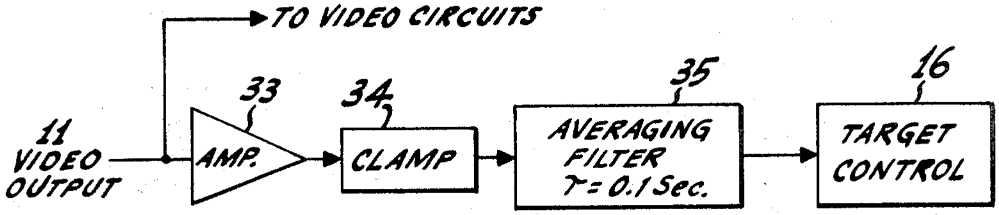
FIG. 7 is a functional block diagram of an automatic target sensitivity control system according to one feature of the invention.

When the target 1 is utilized as a monochrome television image conversion device, the target sensitivity may be automatically controlled by means of the circuitry illustrated in FIG. 7, to maintain the video output signal within an acceptable range over a wide dynamic range of light intensity of the incident optical image.

As shown in FIG. 7, the video output signal 11 is fed into an amplifier 33, the output of which is coupled to a clamp 34, which establishes a DC reference level for the video signal. The clamped video signal is then filtered by the averaging filter 35 to provide a DC signal representative of the average video signal integrated over a period on the order of 0.1 second, corresponding to three frames a conventional NTSC television signal.

The resultant DC signal, which is related to the intensity of the optical image incident on the target 1, is fed into the target control circuit 16, which produces a corresponding DC signal to drive the variable voltage source 15 (see FIG. 1), thus varying the bias on the control electrode 13 and therefore changing the sensitivity of the target 1 to the optical image. The polarity of the signal applied to the source 15 is such that increases in video output result in applying an increased negative bias to the control electrode 13, so that the video output is reduced to maintain it within a desired range.

The target control circuit 16 is so designed that when the video output signal 11 drops below a predetermined threshold value, the polarity of the voltage applied to the source 15 is reversed, i.e. the control electrode 13 is made somewhat positive with respect to the target substrate 4 so as to provide increased target sensitivity.

By varying the bias voltage applied to the control electrode 13 between suitably selected discrete voltage values, as previously mentioned, the spectral response of the target 1 may be varied to produce color television video signals. A suitable circuit for operating the target 1 as a time shared color television image pickup tube is illustrated in FIG. 8.

Figure 8:
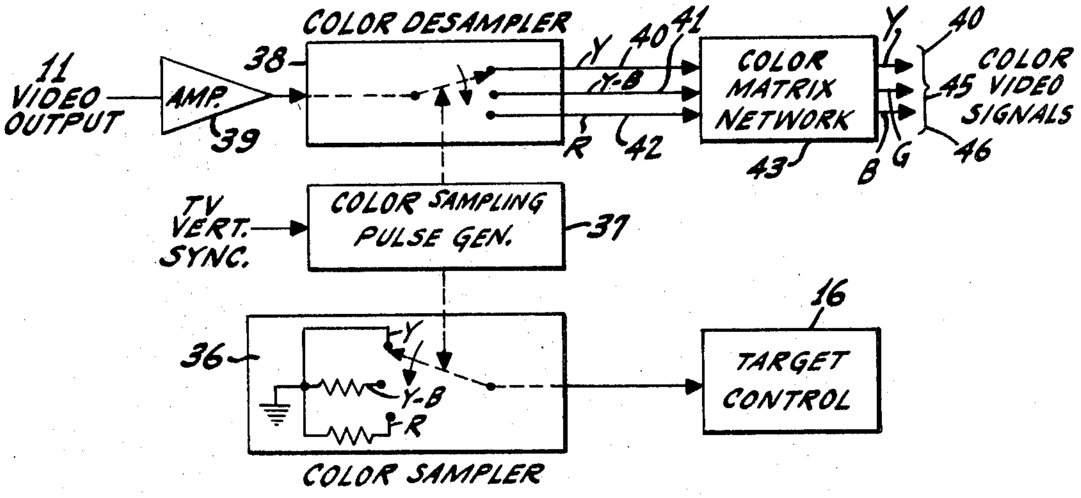
FIG. 8 is a functional block diagram of a sequential color television image conversion system according to another feature of the invention.

The color television system of FIG. 8 operates by applying three discrete voltages to the control electrode 13, each voltage being applied for one complete frame time (1/30 second). Thus, three television frames, i.e. 0.1 second, are required for generation of a complete color television picture. The three discrete voltage bias values, correspond to (i) the luminance signal Y (substantially zero bias voltage) corresponding to the target 1 being sensitive to the entire visible spectrum, (ii) a blue exhausted signal Y–B corresponding to a control voltage $V_1$ applied to the electrode 13, and (iii) a red signal R corresponding to a control voltage substantially higher than $V_1$ applied to the electrode 13.

Switching between these three values is accomplished by a color sampler circuit 36 which sequentially switches between the control voltage bias values required to produce the video signals Y, Y–B and R in response to switching control signals generated by the color sampling pulse generator 37, which is in turn synchronized with the television vertical sync signal produced by a conventional TV sync generator (not shown).

In order to separate the video output signal 11 into its three constituent signals Y, Y–B and R containing the color information, a color desampler circuit 38 sequentially commutates the video output signal, after amplification by a suitable amplifier circuit 39, to three output lines corresponding to the desired signals. The color desampler 38 is switched at one frame time intervals, in synchronism with the color sampler 36, in response to a control switching signal generated by the color sampler pulse generator 37.

The resultant video signals 40, 41 and 42 emerging from the color desampler 38 contain the Y, Y–B and R color information, respectively. In order to obtain the desired green and blue color video signals required for standard television systems, the color information signals 40 to 42 must be matrixed, i.e. in accordance with the following equations:

$$G=Y-B-R$$

$$B=Y-G-R$$

Figure 9:
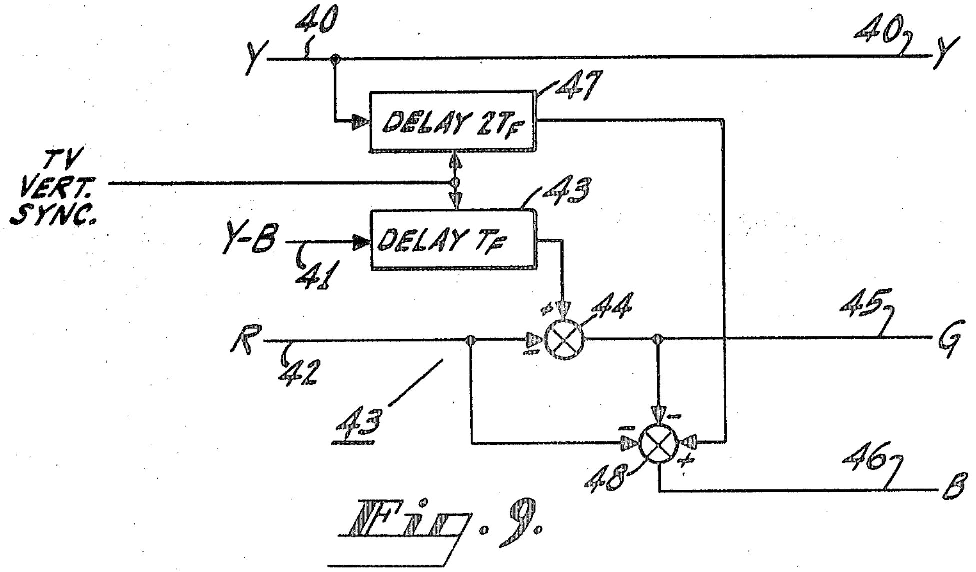
FIG. 9 is a functional block diagram of the color matrix network utilized in the color television system shown in FIG. 8.

This matrixing is accomplished by the color matrix network 43, which is shown in more detail in FIG. 9.

Since the Y, Y–B and R color information signals 40 to 42 are sequentially generated at intervals equal to the frame time $T_f$ (1/30 second), suitable delays must be introduced to permit matrixing of these signals. Since the Y–B color information signal 41 appears one frame prior to the red color information signal 42, the signal 41 is delayed for exactly one frame time by the delay circuit 43, which may comprise a suitably synchronized video tape recorder and associated circuitry. The red color information signal 42 is subtracted from the output of the delay circuit 43 by the differential amplifier 44 to yield the green color signal 45.

The green color video signal 45, as well as the red color information 42, appears two frame times later than the luminance signal 40. In order to obtain the blue color video signal 46, the luminance signal 40 is delayed exactly two frame times by the delay circuit 47, which may also comprise a suitably synchronized video tape recorder and associated circuitry. The red color information signal 42 and the green color video signal 45 is subtracted from the delayed luminance signal 40 by the differential amplifier circuit 48, to yield the blue color video signal 46.

These color video signals may be processed in accordance with standard techniques to reproduce the original optical image.

In addition to modulation of the sensitivity and spectral response of the target 1, the control electrode 13 (see FIG. 1) may be employed to reduce the target sensitivity to a negligible value, i.e. to "cut off" the target from the incident optical image.

This "cutoff" effect may be realized by applying a relatively negative bias to the control electrode 13 of sufficiently large value to substantially eliminate the field-free region of the substrate 4. By alternately varying the control voltage applied to the electrode 13 (with respect to the substrate 4) between substantially zero (or a small positive value) and the large negative "cutoff" value, the vidicon may be provided with a high speed electronic shutter or an automatic exposure exposure control.

In addition to employing switching between zero and cutoff values of control electrode voltage, an electronic shutter effect may also be achieved by inserting in front of the target 1 an optical filter which passes only the shorter wavelengths (e.g., blue light). By switching the control voltage applied to the electrode 13 so as to eliminate the response of the target 1 to these shorter wavelengths, an effective shutter action is achieved.

Where it is desired to provide a specified dynamic range of sensitivity control, i.e., of the sensitivity of the video signal current to the intensity of the incident optical image, an appropriately designed filter may be employed. For example, it may be desired to provide a sensitivity control dynamic range of at least 50:1. Reference to FIG. 5 and to the previous discussion in connection therewith indicates that a 50:1 sensitivity control range may be achieved for light of wavelength shorter than 6500 Angstroms. Therefore, an optical filter should be provided which eliminates from the optical image incident on the video target all light which contains wavelengths longer than 6500 Angstroms.

Where any particular dynamic range of sensitivity control is desired, the required filter cutoff wavelength may be determined by reference to spectral response curves such as those shown in FIG. 5.

While providing the desired dynamic range of sensitivity control, the use of a variable amplitude control electrode voltage results in some shifting of intensity distribution over the optical image pattern, i.e. the relation brightness of differently colored parts of the image may appear to change somewhat as the control voltage applied to the electrode 13 is varied. However, for many applications this variation is of no consequence.

Where shifting of relative brightness of portions of the image due to variation of control voltage is to be minimized, the sensitivity of video signal current to the intensity of the incident optical image may be varied by periodically (preferably one per frame) applying a pulsed control voltage of fixed amplitude to the electrode 13. By varying the width (i.e. the duty cycle) of the applied control signal pulse, the effective exposure time and therefore the sensitivity of the target may be correspondingly varied without shifting the relative brightness of portions of the image.

Figure 10:
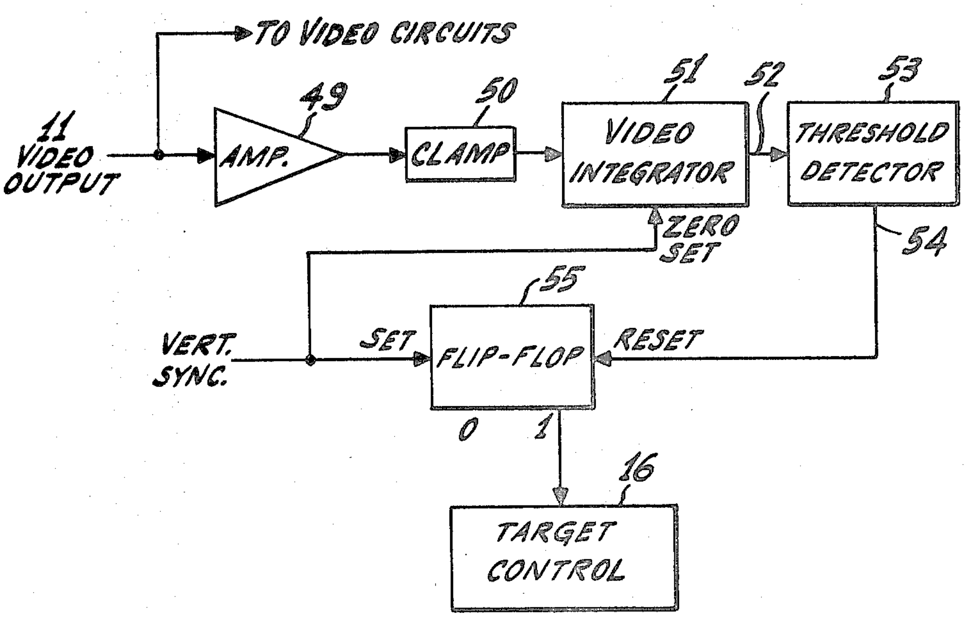
FIG. 10 is a functional block diagram of an automatic target sensitivity control system according to still another feature of the invention.

An automatic exposure control system for the target 1 utilizing automatic switching of control electrode bias voltage V between quiescent and cutoff values is shown in FIG. 10.

The automatic exposure control circuit shown in FIG. 10 operates by integrating the video output signal 11 (the integrated video signal being related to the total photon flux incident upon the target 1) during each television frame until the desired light flux is obtained. When the integrated video signal exceeds a threshold value corresponding to the total desired light flux, the voltage V applied to the control electrode 13 (see FIG. 1) is suddenly increased to the "cutoff" value to render the target substantially insensitive to additional light flux from the optical image.

Switching the control voltage to this 37 cutoff" value, however, does not destroy the electrical information which has previously been stored in the diodes associated with the PN junctions 7 (see FIG. 1), so that the scanning electron beam may continue to read out the electrical information stored in the diode array corresponding to the optical image incident upon the target 1 prior to switching of the control electrode bias voltage to its "cutoff" value.

As shown in FIG. 10, the video output signal 11 is amplified by the amplifier circuit 49 and referenced to a DC potential by the clamp circuit 50. The clamped video signal is then integrated by the video integrator 51 to provide a monotonically increasing signal 52 representative of the total light flux incident upon the target 1. The video integrator 51 is reset to zero at the end of each frame by the vertical sync signal.

The integrated video signal 52 is coupled to a threshold detector circuit 53 which generates an output signal 54 when the integrated video signal exceeds a value corresponding to the total desired light flux.

A set-reset flip-flop 55 is coupled to the target control circuit 16. When a signal is present at the 1 output terminal of the flip1flop 55, the target control circuit 16 acts to establish a voltage V across the source 15 (see FIG. 1), i.e. between the control electrode 13 and the substrate 4, corresponding to the "cutoff" bias value. The flip-flop 55 is set by the vertical sync signal and reset (to provide a signal at the 1 output terminal) by means of the threshold detector 54. Therefore, the target control 16 maintains the bias applied to the control electrode 13 at a quiescent value until the integrated video signal 52 reaches the desired threshold value, at which time the target control 16 causes the source 15 to "cut off" the target 1 by applying a suitably large negative bias to the control electrode 13.

I claim:

1. Optical image conversion apparatus, comprising:
a semiconductor wafer of one conductivity type having at least one region of opposite conductivity type adjacent one major surface of said wafer, with a PN junction between said region and the adjacent part of said wafer;
a transparent insulating layer on the other major surface of the wafer;
minority carrier recombination means at said other major surface comprising a minority carrier collecting region; and
a transparent electrode on said transparent insulating layer.

2. Apparatus according to claim 1, further comprising a multiplicity of spaced opposite conductivity-type regions inset into said wafer from said one major surface, with a PN junction between each of said regions and the adjacent part of said wafer.

3. Apparatus according to claim 2, wherein said semiconductor comprises silicon.

4. Apparatus according to claim 3, wherein said recombination means comprises a minority carrier collecting region of said opposite conductivity-type inset into said wafer from said other major surface.

5. Apparatus according to claim 4, wherein at least a part of said collecting region underlies said transparent electrode.

6. Apparatus according to claim 3, wherein said recombination means comprises a metallic electrode on a limited part of said other major surface, said metallic electrode cooperating with said surface part to form a Schottky barrier at the interface therebetween.

7. Apparatus according to claim 6, wherein said metallic electrode comprises platinum silicide.

8. Apparatus according to claim 2, wherein said at least one region is of P-conductivity-type.

9. Apparatus according to claim 2, further comprising:
a source of potential difference; and
means, including said source and said transparent electrode, for establishing an electric field in a portion of said wafer adjacent said other major surface to deplete said portion of majority carriers, said field acting to impel minority carriers toward said other major surface.

10. Optical image conversion apparatus, comprising:
a semiconductor wafer of one conductivity type having a multiplicity of spaced opposite conductivity-type regions inset into said wafer from one major surface, with a PN junction between each of said regions and the adjacent part of said wafer;
a transparent insulating layer on the other major surface of the wafer;
minority carrier recombination means at said other major surface;
a transparent electrode on said transparent insulating layer;
a source of potential difference;
means, including said source and said transparent electrode, for establishing an electric field in a portion of said wafer adjacent said other major surface to deplete said portion of majority carriers, said field acting to impel minority carriers toward said other major surface;
scanning means, including an electron beam, for successively applying a given reverse bias to each of said PN junctions;
means responsive to fluctuations in the current carried by said electron beam to derive a signal representative of the light flux incident on said wafer; and
means, responsive to said signal, for varying said applied potential difference.

11. Apparatus according to claim 10, wherein said signal deriving means includes integrating means, and said signal indicates the time at which said flux reaches a predetermined value, said potential difference being varied at said time to substantially increase the portion of said wafer depleted of majority carriers.

12. Optical image on conversion apparatus, comprising:
a semiconductor wafer of one conductivity type having a multiplicity of spaced opposite conductivity-type regions inset into said wafer from one major surface, with a PN junction between each of said regions and the adjacent part of said wafer;
a transparent insulating layer on the other major surface of the wafer;
minority carrier recombination means at said other major surface;
a transparent electrode on said transparent insulating layer;
a source of potential difference; and
means, including said source and said transparent electrode, for establishing an electric field in a portion of said wafer adjacent said other major surface to deplete said portion of majority carriers, said field acting to impel minority carriers toward said other major surface;
means for periodically varying said potential difference to vary the spectral response of said wafer to incident light;
scanning means, including an electron beam, for successively applying a given reverse bias to each of said PN junctions;
means for detecting fluctuations in the current carried by said electron beam; and
means, responsive to said detecting means and synchronous with said periodic varying means, for deriving a plurality of video signals representative of corresponding color components of any light incident on said wafer.

13. Optical image conversion apparatus, comprising:
a semiconductor wafer having a given major surface exposed to said image, said wafer comprising (i) a body of semiconductor material of one conductivity type, and (ii) at least one region of opposite conductivity-type semiconductor material forming a PN junction with said body, said region having a portion exposed at the other major surface of said wafer;
scanning means, including an electron beam for periodically establishing a predetermined reverse bias across said PN junction;
means, responsive to fluctuations in the current carried by said electron beam, for deriving a video signal representative of the intensity of said image integrated over said period; and
means including a control electrode capacitively coupled to said wafer and including also a minority carrier collecting region at said given major surface, for varying the response of said video signal to incident optical radiation.

14. Optical image conversion apparatus, comprising:
a semiconductor wafer having a given major surface exposed to said image, said wafer comprising (i) a body of semiconductor material of one conductivity type, and (ii) at least one region of opposite conductivity-type semiconductor material forming a PN junction with said body, said region having a portion exposed at the other major surface of said wafer;
scanning means, including an electron beam, for periodically establishing a predetermined reverse bias across said PN junction;

means, responsive to fluctuations in the current carried by said electron beam, for deriving a video signal representative of the intensity of said image integrated over said period;

means, including a control electrode capacitively coupled to said wafer, for varying the response of said video signal to incident optical radiation; and automatic exposure control means, responsive to a control signal, for substantially reducing the sensitivity of said video signal to incident optical radiation, said scanning means and said video signal deriving means continuing to operate after said sensitivity reduction.

15. Apparatus according to claim 14, wherein said control means comprises (i) means for monotonically integrating said video signal, and (ii) threshold means for generating said control signal when the integrated video signal exceeds a predetermined value.

16. Optical image conversion apparatus, comprising:

a semiconductor wafer having a given major surface exposed to said image, said wafer comprising (i) a body of semiconductor material of one conductivity type, and (ii) at least one region of opposite conductivity-type semiconductor material forming a PN junction with said body, said region having a portion exposed at the other major surface of said wafer;

scanning means, including an electron beam, for periodically establishing a predetermined reverse bias across said PN junction;

means, responsive to fluctuations in the current carried by said electron beam, for deriving a video signal representative of the intensity of said image integrated over said period;

means, including a control electrode capacitively coupled to said wafer, for varying the response of said video signal to incident optical radiation;

means for applying a control signal to said electrode, said signal being capable of varying the sensitivity of said signal being capable of varying the sensitivity of said video signal to incident optical radiation, said sensitivity variation having a given dynamic range for optical radiation of wavelength shorter than a particular value; and an optical filter for exposing said surface to only that optical radiation of a wavelength shorter than said particular value.

17. Apparatus according to claim 1, wherein said semiconductor comprises silicon.

18. Optical image conversion apparatus, comprising:

a target comprising a semiconductor wafer of one conductivity type having at least one region of opposite conductivity type adjacent one major surface of the wafer;

minority carrier recombination means at the wafer surface exposed to said optical image including a minority carrier collecting region; and means, including a control electrode capacitively coupled to said surface, for varying the response of said target to incident optical radiation.

19. Apparatus according to claim 18, further comprising vacuum tube means for projecting an electron beam onto a major surface of said wafer.

20. Apparatus according to claim 19, further comprising means, including said electron beam, for deriving a signal representative of said optical radiation.